(12) United States Patent
Schiff

(10) Patent No.: US 7,599,657 B2
(45) Date of Patent: Oct. 6, 2009

(54) REDUCING SERVICE OUTAGES IN A MULTIBEAM SATELLITE SYSTEM

(75) Inventor: Leonard Norman Schiff, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 372 days.

(21) Appl. No.: 11/177,616

(22) Filed: Jul. 7, 2005

(65) Prior Publication Data

US 2005/0272370 A1 Dec. 8, 2005

Related U.S. Application Data

(62) Division of application No. 10/602,356, filed on Jun. 23, 2003, now abandoned.

(60) Provisional application No. 60/391,984, filed on Jun. 25, 2002.

(51) Int. Cl.
*H04B 7/185* (2006.01)
*H04B 7/19* (2006.01)
*H04Q 7/20* (2006.01)

(52) U.S. Cl. .............. 455/13.2; 455/427; 455/12.1; 455/13.1

(58) Field of Classification Search ............. 375/200, 375/211; 370/318; 455/13.4, 10, 427, 429, 455/428, 431, 12.1, 13.1, 13.2
See application file for complete search history.

(56) References Cited

U.S. PATENT DOCUMENTS

| | | | | |
|---|---|---|---|---|
| 4,041,397 A | | 8/1977 | Bauer et al. | |
| 4,287,598 A | * | 9/1981 | Langseth et al. | 455/505 |
| 4,787,598 A | * | 11/1988 | Rahn et al. | 249/162 |
| 4,910,792 A | | 3/1990 | Takahata et al. | |
| 4,941,199 A | * | 7/1990 | Saam | 455/10 |
| 5,903,549 A | | 5/1999 | von der Embse et al. | |
| 5,924,015 A | * | 7/1999 | Garrison et al. | 455/13.4 |
| 6,097,752 A | * | 8/2000 | Wiedeman et al. | 375/130 |
| 6,101,385 A | * | 8/2000 | Monte et al. | 455/427 |
| 6,314,290 B1 | * | 11/2001 | Joshi et al. | 455/427 |
| 6,587,687 B1 | * | 7/2003 | Wiedeman | 455/428 |
| 6,587,689 B1 | * | 7/2003 | Panasik | 455/440 |
| 6,813,476 B1 | * | 11/2004 | Brooker | 455/430 |
| 6,859,652 B2 | * | 2/2005 | Karabinis et al. | 455/427 |
| 7,047,029 B1 | * | 5/2006 | Godwin et al. | 455/505 |
| 7,245,913 B1 | * | 7/2007 | Nguyen et al. | 455/435.2 |
| 2003/0139181 A1 | * | 7/2003 | Roy et al. | 455/427 |

FOREIGN PATENT DOCUMENTS

| | | |
|---|---|---|
| GB | 1223163 | 2/1971 |
| JP | 63-179629 | 7/1988 |

OTHER PUBLICATIONS

International Search Report, PCT/US2003/019936 - International Search Authority - European Patent Office - Jan. 13, 2004.

* cited by examiner

*Primary Examiner*—Tilahun B Gesesse
(74) *Attorney, Agent, or Firm*—Thomas Rouse; Ashish L. Patel

(57) ABSTRACT

A satellite is linked to a number of gateways by a number of feeder links. When a degraded link is detected among the feeder links, communications are switched from the degraded link to a diversity link shared among the feeder links. In one embodiment, the diversity link is connected to a diversity gateway located outside a service area of the satellite. In another embodiment, the diversity link comprises channels distributed among the feeder links within the service area.

27 Claims, 11 Drawing Sheets

MACHINE READABLE MEDIUM
920

MACHINE EXECUTABLE INSTRUCTIONS
910

FIG. 9

REDUCING SERVICE OUTAGES IN A MULTIBEAM SATELLITE SYSTEM

CLAIM OF PRIORITY UNDER 35 U.S.C. §120

The present Application for Patent is a Divisional and claims priority to U.S. patent application Ser. No. 10/602,356, entitled "REDUCING SERVICE OUTAGES IN A MULTIBEAM SATELLITE SYSTEM" filed Jun. 23, 2003 now abandoned, assigned to the assignee hereof and hereby expressly incorporated by reference herein and which claims the benefits of U.S. provisional application No. 60/391,984, filed on Jun. 25, 2002.

BACKGROUND

1. Field

The present invention pertains to the field of satellite communications. More particularly, this invention relates to reducing service outages in a multibeam satellite system 2. Background Satellites, or constellations of satellites, can provide communications virtually anywhere without costly infrastructure, such as cellular towers or landline connections to terminal users. These advantages make satellites ideal for a wide variety of applications, including high speed data communications. For instance, rather than limiting broadband Internet service to areas where Digital Subscriber Lines (DSL), digital cable, or fiber optics are available, a satellite-based system can provide comparable service to virtually every potential user, including urban, suburban, rural, or mobile users.

For example, a satellite in geosynchronous orbit can have a service area the size of the entire continental United States. The combined data traffic in the service area for broadband Internet access can consume a large volume of bandwidth, but bandwidth in satellite communications is limited by the available spectrum of radio frequencies. In order to have enough bandwidth, the satellite projects multiple "beams", rather than a single beam, to cover the service area in a beam pattern similar to cell patterns used in cellular phone systems. Each beam reuses the available frequencies, or some portion thereof, to substantially increase the total bandwidth through the satellite.

The satellite "bounces" signals back and forth between terminals in a beam and a "gateway" that supports the beam. The gateway can direct communications among the terminals and between the terminals and the outside world. For instance, the gateway may include an Internet access point to connect the terminals in the beam to the Internet.

A beam can cover a large area and provide service to many terminals. A feeder link between a gateway and a satellite is essentially a signal stream narrowly focused in a line of sight between the gateway and the satellite. A feeder link supports all of the data traffic between the satellite for all the terminals in a given beam. If the signal quality for the feeder link degrades beyond a certain limit, the entire beam experiences a service outage. Thermal noise can degrade a feeder link.

One solution to the feeder link bottleneck is "spatial diversity." Rain of sufficient intensity to cause a service outage is usually highly localized. The probability of a rain intense enough to cause a service outage at two diverse locations simultaneously is very low. Diversity is achieved using a redundant gateway at some diverse location, usually several miles away. Traditionally, diversity is done on a 1-for-1 basis. That is, each feeder link is supported by two gateways, one being held in "hot" standby in case the active gateway fails.

1-for-1 diversity is useful when dealing with a satellite system connected to a circuit-based network, such as a typical public switched telephone network (PSTN). In a satellite system, the intended recipient of a telephone call is associated with a particular beam. The call is routed through the PSTN network to a gateway serving that particular beam. When the gateway completes the call to the recipient terminal through the satellite, the "circuit" between the caller and the recipient is said to have been established. If the gateway then experiences a service outage, the circuit is broken and the call is lost. However, with 1-for-1 diversity, the "gateway" is actually two redundant gateways that are physically separated by a number of miles. One is active and the other is in "hot" standby mode. The two gateways appear as one network location in the telephone network so that if one gateway fails, the other gateway can immediately take its place without breaking the circuit.

One drawback to 1-for-1 diversity is cost. Gateways can be very expensive, including large antenna arrays, high speed routers, equipment for converting large volumes of data to and from radio frequency signals, and the like. A satellite system serving the continental United States may use many tens, or even hundreds, of gateway locations. 1-for-1 diversity for each gateway location can dramatically increase the cost of the system. It is especially important to keep costs, and hence subscriber rates, low in the highly competitive data services markets, such as broadband Internet access.

SUMMARY

Briefly, methods and apparatus are disclosed for reducing service outages in communication systems such as in multibeam satellite systems, by sharing diversity resources among multiple satellite feeder links. The present invention takes advantage of "recoverable" network routing protocols, such as the Internet Protocol (IP) and if one data path fails in a communications network, other paths are automatically explored to find one or more paths available for use. In various embodiments of the invention, network connections in a satellite system are switched on and off as feeder links fail and recover.

This can be accomplished by detecting a degraded link among a plurality of feeder links, which are connected between a satellite and a corresponding plurality of gateways; and switching from the degraded link to a diversity link, which resides between the satellite and a diversity gateway located outside a service area of the satellite. The plurality of feeder links may comprise at least one of a plurality of forward links and a plurality of reverse links. The process of detecting the degraded link can comprise measuring a degradation in a signal-to-noise ratio in a beacon signal received from the satellite at a particular gateway, or measuring an instantaneous received signal strength, and recognizing that a feeder link corresponding to the particular gateway is the degraded link when the degradation exceeds a threshold. Furthermore, switching from the degraded link can comprise sending a switch command from a gateway corresponding to the degraded link to the satellite. The switching from the degraded link can also comprise re-routing data through the satellite to use a feeder horn corresponding to the diversity link rather than a feeder horn corresponding to the degraded link.

In further embodiments, a plurality of additional degraded links among the plurality of feeder links are detected, and communications are switched from the plurality of additional degraded links to a plurality of additional diversity links, said plurality of additional diversity links being between the satellite and a plurality of additional diversity gateways located outside the service area. The method can further comprise detecting that the degraded link has become a recovered link, and switching back from the diversity link to the recovered link.

In another embodiment, an apparatus for realizing features of the invention comprises a plurality of feeder horns adapted to provide a plurality of feeder links between a satellite and a corresponding plurality of gateways, each feeder horn being coupled to at least one data path, a diversity horn adapted to provide a diversity link between the satellite and a diversity gateway located outside a service area of the satellite, the diversity horn coupled to a switch matrix, and a plurality of terminal horns corresponding to the plurality of feeder horns, which are adapted to provide a plurality of terminal beams, each terminal horn coupled to at least one data path. The data paths are coupled to the switch matrix, and the switch matrix is adapted to selectively couple any one of the plurality of terminal horns to the diversity horn rather than a corresponding one of the plurality of feeder horns.

In other embodiments, the apparatus further comprises a plurality of additional diversity horns, each adapted to provide a plurality of additional diversity links between the satellite and a plurality of additional diversity gateways located outside the service area, with the switch matrix being adapted to selectively couple any one of the plurality of terminal horns to any one of the plurality of additional diversity horns rather than a corresponding one of the plurality of feeder horns. The apparatus can employ a means for receiving switch commands which determine the operation of the switch matrix.

In further aspects, each of the plurality of feeder links comprise a plurality of channels with the plurality of channels in at least one of the plurality of feeder links comprising at least one diversity channel, and the switching for degraded links comprises switching a plurality of degraded channels from the degraded link to a corresponding plurality of diversity channels in one or more of the plurality of feeder links. The degraded link can use both active channels and diversity channels, with switching of the plurality of degraded channels comprising switching only the active channels. This switching uses re-routing of individual ones of the plurality of degraded channels to selected ones of the plurality of diversity channels. In addition, a plurality of additional degraded links can be detected from among the plurality of feeder links, and switching of a plurality of additional degraded channels from the plurality of additional degraded links to a plurality of additional diversity channels among the plurality of feeder links can occur.

In one embodiment, apparatus for realizing this method can comprise a plurality of feeder horns adapted to provide a plurality of feeder links between a satellite and a corresponding plurality of gateways, with each comprising a plurality of feeder channels, and the plurality of feeder channels in at least one of the plurality of feeder links comprising at least one diversity channel, a plurality of terminal horns corresponding to the plurality of feeder horns, which are adapted to provide a plurality of terminal beams, each having a plurality of terminal channels, and a switch matrix coupled to the plurality of feed horns and to the plurality of terminal horns. The switch matrix is adapted to selectively couple any one of the plurality of terminal channels from the plurality of terminal horns, to the at least one diversity channel rather than a corresponding feeder channel.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

FIG. 9 illustrates one embodiment of a machine-readable medium to store executable instructions to implement various embodiments.

DETAILED DESCRIPTION

Figure 1:
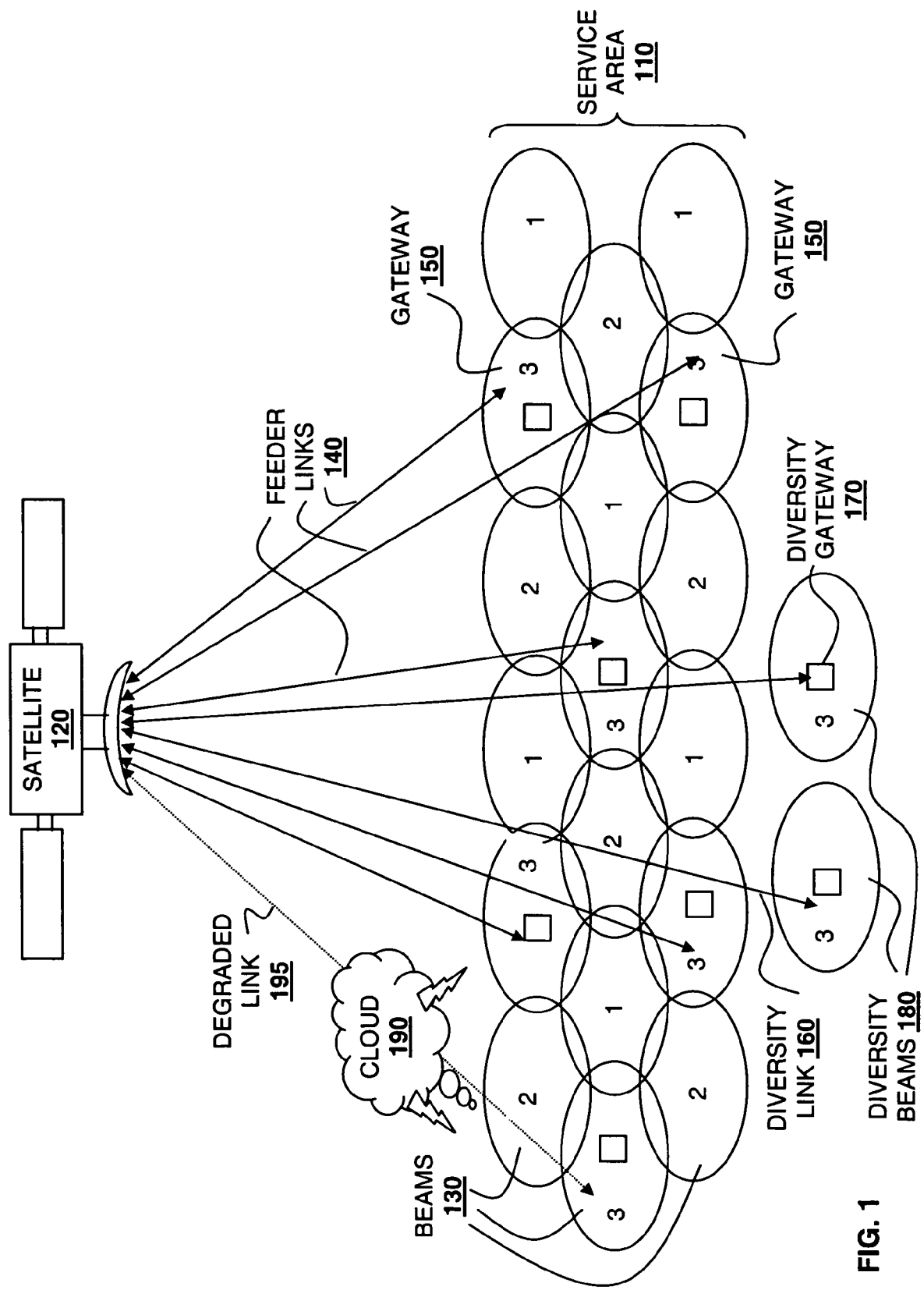
FIG. 1 illustrates one embodiment of the present invention in a satellite system.

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

For example, references provided below to antenna horns and feeds, as well as the operations of feeding or switching signals, are non-exclusive examples of techniques for establishing the communication links and channels discussed as part of implementing embodiments of the invention. As will be readily apparent to those skilled in the art, these are not the only possible techniques available to realize the methods and apparatus of the invention. Antenna elements, antenna horns, one or transducers, or antenna arrays, including phased arrays, and the like can be fed with signals in a variety of ways as part of a beam forming antenna structure to produce the desired beams. The feed signals can include weighted taps among the antenna elements which help to define and direct the antenna beams.

Therefore, the switching matrix discussed below is also not just applicable to a set of antenna horns but to a series of antenna transducers and transmission elements, as well as to the signal sources being used to provide, or feed, the antenna structure(s) that generate the beams to carry or transfer the desired links and signal paths. That is, the matrix can switch between various input signal sources such as amplifiers or other known elements transferring the signals to be transmitted, and selectively control where across a beam pattern created by a beam former they are to be distributed, so as to "effectively" select where they transmitted from, as if selecting an individual antenna horn. Such alternatives in satellite hardware and signal transfer mechanisms are within the teachings of the disclosure, and well understood by those skilled in the art.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

The present invention reduces service outages in a multibeam satellite system by sharing diversity resources among multiple satellite feeder links. The present invention takes advantage of "recoverable" network routing protocols, such as the Internet Protocol (IP). In a recoverable network, if one data path fails, other paths are automatically explored, and any available path is used. In which case, various embodiments of the present invention switch network connections in the satellite system on and off as feeder links fail and recover. It is left to the network connected to the satellite system to find access points that are currently active.

As discussed above, a PSTN is generally not capable of recovering from a loss of communications. If a connection fails, the network does not have the capability to find a new path and reroute a call. Instead the circuit is broken and the service is lost. 1-for-1 diversity provides a solution, where the second gateway essentially provides a redundant connection, as opposed to an alternative path. However, sharing diversity resources, as enabled by the present invention, can provide a tremendous cost savings over traditional 1-for-1 gateway diversity with comparable improvement in service reliability.

FIG. 1 illustrates a satellite-based communications system incorporating one embodiment of the present invention. Service area 110 is covered by N=18 beams 130 shown as circular projections. FIG. 1 illustrates a K=3 frequency reuse pattern in service area 110. That is, the available frequency spectrum is divided into three divisions, and each beam uses one of the divisions, marked 1, 2, or 3. The beams are arranged so that no two neighboring beams are assigned to the same frequency division. This reduces interference among beams, improving signal quality and, hence, data reliability. The overall bandwidth of the system is increased by a factor of N/K, which equals 6 in this case. Other embodiments of the present invention may be implemented with frequency reuse patterns other than K=3. Similarly, the present invention is not constrained to any particular number of beams or beam patterns. Larger values for K increase signal quality but decrease bandwidth available in each cell. Larger values of N increase bandwidth but also increase cost due in part to more complicated antenna arrays.

Service area 110 may cover a very large area. For instance, if satellite 120 is a geosynchronous satellite, service area 110 could cover up to one third of the surface area of the Earth. A more typical size for service area 110, however, would be the size of the continental United States, referred to as CONUS. Satellite 120 may represent a single satellite or a constellation of satellites in any number of orbital locations from low earth orbit up to geosynchronous.

Each beam 130 may cover thousands of square miles and provide service to tens of thousands of terminals (not shown). Terminal links connect terminals in each beam 130 to satellite 120. The terminal links are not specifically shown in FIG. 1, but are collectively represented by the beam projections, beams 130, in service area 110. Gateways 150, on the other hand, connect to satellite 120 through feeder links 140. Even in systems with K>1 gateways generally use all the frequency bandwidth. Feeder and terminal links carry both forward traffic, which is traffic to a terminal, and reverse traffic, which is traffic from a terminal.

Terminal links and feeder links operate within the same spectrum of available frequency. In which case, in the illustrated embodiment where K=3, each feeder link 140 has enough frequency bandwidth to service three beams 130. In general, the minimum number of gateways needed for a service area is equal to the number of beams, N, divided by the number of frequency divisions, K. With 18 beams, service area 110 needs six gateways 150.

If 1-for-1 diversity were used in service area 110, a total of 12 gateways would be needed. In the illustrated embodiment, however, only two diversity gateways 170 are used and they are shared among gateways 150. If a heavy rain storm or some other interference, represented by a cloud 190, degrades a feeder link to the point of causing a service outage, the data traffic from degraded link 195 is switched to one of the available diversity links 160 servicing diversity beams 180, to access the external network through a corresponding diversity gateway 170. With two diversity gateways 170, any two gateways 150 can experience an outage at any given time without a service outage to any beam 130.

The very reason this works is that users are connecting to sites on the Internet and do not care through which gateway the connection is made.

Feeder links are fairly robust and capable of handling a medium margin of signal degradation when designed as part of a diversity system. As a result, the probability of a service outage for any one gateway is usually very low, much less than 1% of the time in most circumstances. In which case, 1-for-1 diversity makes very poor use of diversity resources in that 1-for-1 diversity doubles the number of expensive gateways to compensate for a low probability event. In contrast, by sharing diversity resources, the present invention pools the probability of service outages from many gateways and compensates for the pooled probability with a comparatively small set of redundant gateways. The probability of multiple gateways experiencing an outage simultaneously is so low that the small set of redundant resources can provide service quality comparable to 1-for-1 diversity, but at much lower cost. In the illustrated embodiment, two diversity gateways 170 are used, but, in fact, one diversity gateway may be more than adequate to provide the desired level of service quality. Other embodiments may use more diversity gateways, or a different ratio of diversity gateways to regular gateways, depending on the level of service desired and anticipated interference or blockage.

In the illustrated embodiment, diversity gateways 170 are located outside service area 110. Suitable locations outside the service area should ensure at least a minimum separation between gateways for diversity (for instance, 10 to 20 miles) and at least a minimum separation between gateways for signal isolation between feeder links and diversity links.

At the same time, the locations should not be too far outside the service area. That is, satellite 120 has a certain angular coverage depending on the antenna configuration. The angular coverage is usually a relatively circular projection on the surface of the Earth. The diameter of the coverage area in the embodiment of FIG. 1 needs to be large enough to encompass service area 110, but any additional coverage translates into more cost, either from a higher altitude satellite (for the case of a non-geo satellite) or a higher quality antenna array. Therefore, it is advantageous to place, or site, diversity gateways 170 within the angular coverage that satellite 120 requires to cover service area 110 without significantly modifying the coverage.

Finding locations inside the angular coverage should not be a problem for a service area covering the continental United States, for instance, because the United States is wider in the east-west direction than in the north-south direction. An angular coverage area wide enough to cover the service area will also include at least portions of northern Mexico and southern Canada. Similarly, the vast majority of service areas around the world are likely to be non-circular, thereby leaving some margins around the edges for diversity gateways.

In addition to selecting diversity locations based on distance and coverage angle, service quality may be improved by selecting diversity locations having low probabilities of high rain intensity. Rain degradation intensity is a factor of drop size and drops per unit volume. Areas such as Baja, Sonora, and Chihuahua states in Mexico are suitable locations due to low probability of rain. British Columbia and Alberta provinces in Canada are also suitable locations because, even though rain is common in both places, the rain intensity is usually low. Also, you need a location with access of relatively high bandwidth to the Internet.

In certain situations, it may not be possible to place diversity gateways outside the service area. For instance, if a service area includes an entire country, security concerns may prevent gateways from being located outside the borders of that country. Or, the angular coverage of a satellite may not include enough room outside of the satellite's geo-political or desired service area to accommodate a diversity gateway. In either situation, the embodiment of the present invention illustrated in FIG. 2 provides a solution.

Figure 2:
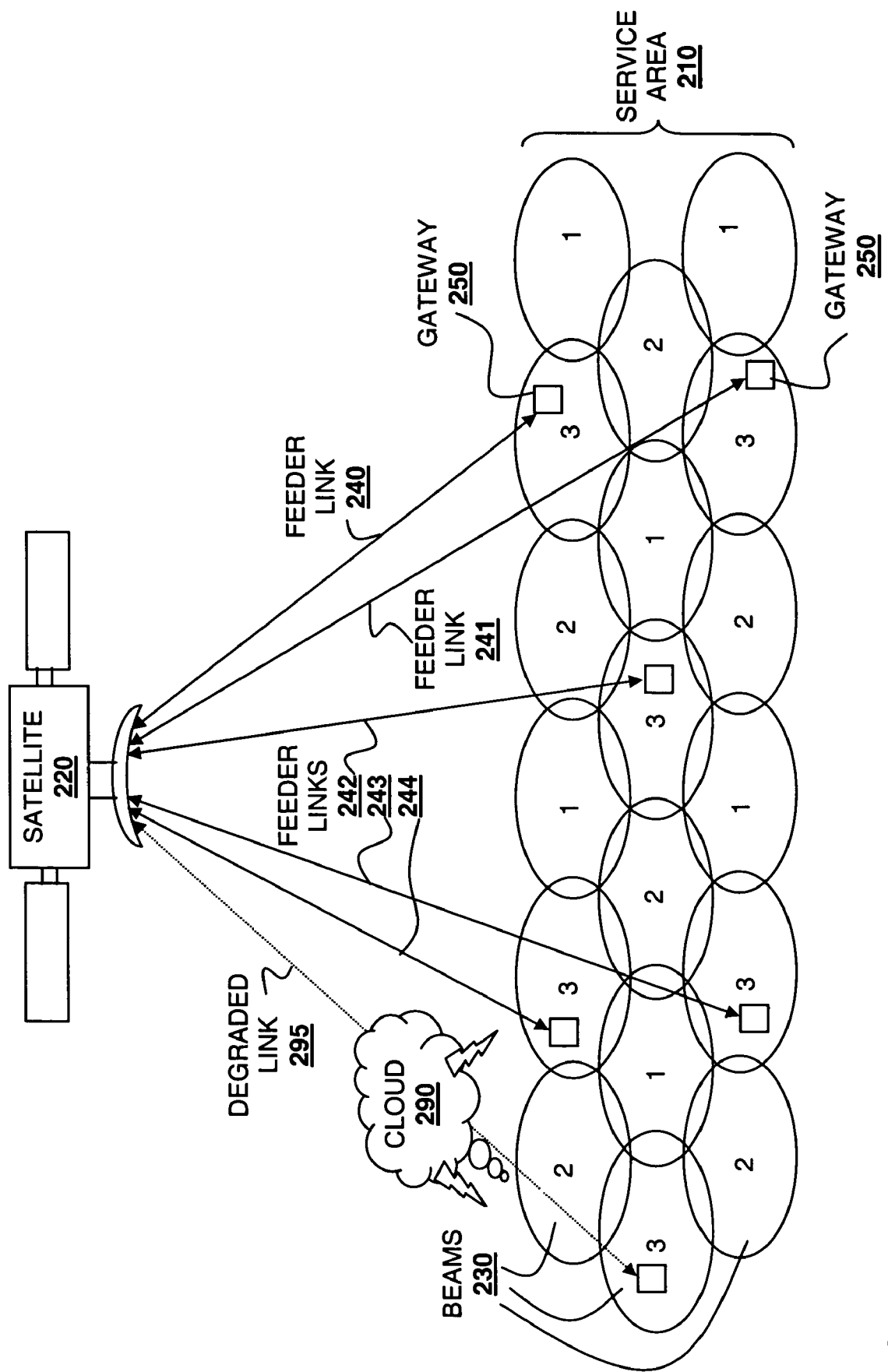
FIG. 2 illustrates another embodiment of the present invention in a satellite system.

FIG. 2 illustrates one embodiment for a satellite system using a satellite 220, gateways 250, and feeder links 240, 241, 242, 243, creating beams 230 to provide service for a service area 210, but having no diversity sites outside of service area 210. Rather than sharing access to redundant feeder links, as was the case in FIG. 1, a certain amount of bandwidth in one or more feeder links 240 (241, 242, 243, and 244), is reserved for diversity. In which case, the bandwidth in degraded link 295, here degraded by the presence of cloud 290, is switched so as to be distributed among one or more of the other feeder links 240 that have bandwidth reserved for diversity.

Figure 3:
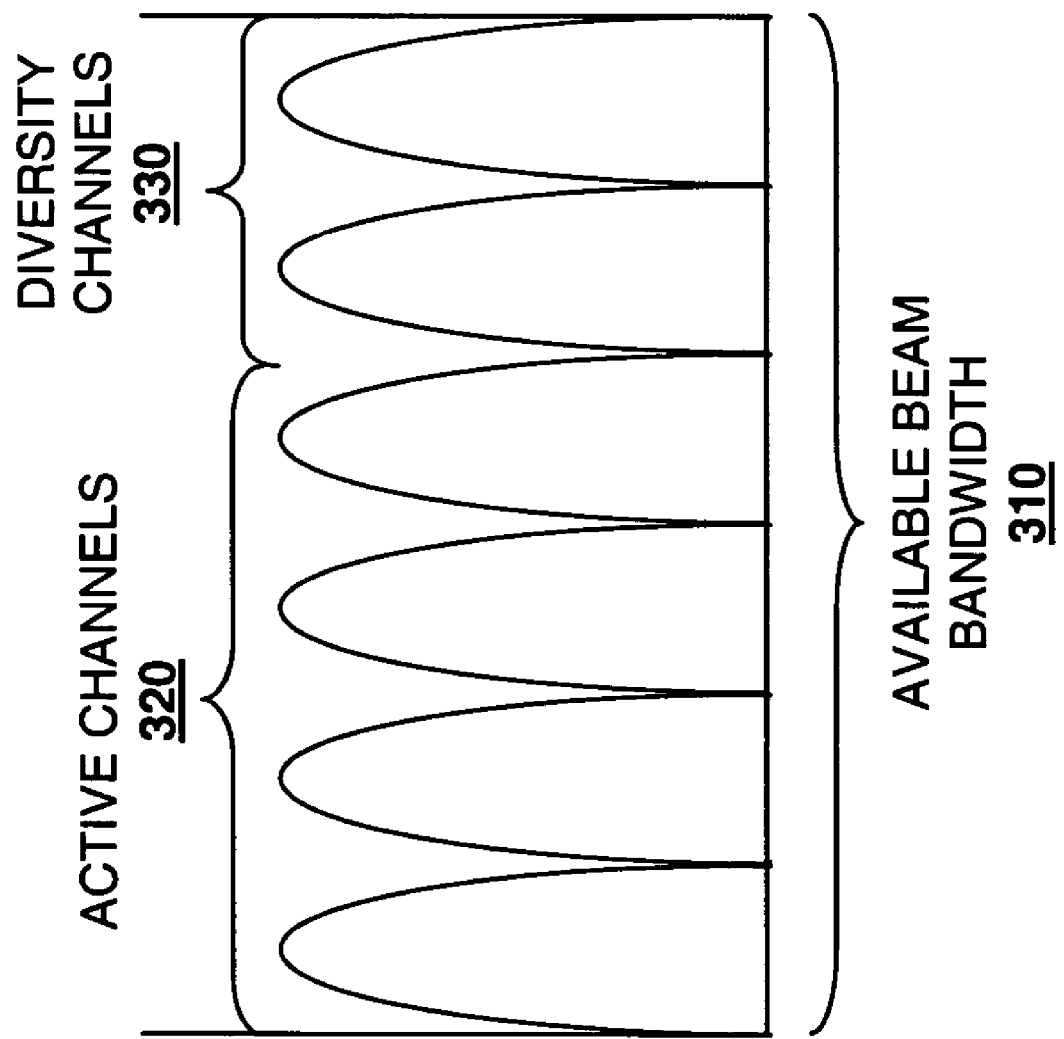
FIG. 3 illustrates one embodiment including channels in a beam.

For example, each feeder link 240 has a certain amount of bandwidth to support a given beam 230. The bandwidth is "channelized". That is, data traffic in the beam is divided into channels. In one embodiment, as shown in FIG. 3, beam bandwidth 310 is divided into 6 channels per beam. Four of the channels 320 are actively used to carry data. Two of the channels 330 are reserved for diversity. It is noted that diversity channels 330 do not need to be reserved, i.e., unused, on a full-time basis. The diversity channels 330 can be used under normal conditions for communications traffic, but when needed for diversity, these channels are used as part of a replacement for a diversity gateway, and, consequently, this gateway to operates with fewer channels for its normal traffic load because the diversity channels 330 are dedicated, or allocated, to the diversity function.

The present invention is not constrained to any particular number of channels in a gateway, or channels dedicated to the diversity function. Various embodiments of the present invention may be implemented having a different total number of channels and may divide the number of channels among active and diversity channels differently than that described above in the illustrative example. Furthermore, other feeder links 240 within the same system, or other beam portions of the same feeder link, may reserve more channels or fewer channels for diversity. The number of channels reserved for diversity may depend, for instance, on the relative load of terminals in a particular beam. That is, with more channels reserved for diversity, the beam has less active channels to support terminals within the corresponding beam. In which case, a beam covering a sparsely populated area may require fewer active channels to support the data load, and, therefore, more channels can be reserved for diversity. Conversely, a beam serving a densely populated area may be required to use all of its available channels. Furthermore, channels in feeder links serviced by gateways in areas of low probability of high rain intensity may preferentially be selected for diversity over channels in feeder links in areas of high probability of high rain intensity.

In one embodiment, rather than reserving a fixed set of diversity channels, the diversity channels are dynamically allocated, for instance, as data loads fluctuate and rain intensities change. In yet another embodiment, a combination of diversity gateways outside the service area is used, together with channel diversity.

Referring back to FIG. 2, assuming, for example, that each feeder link 240 supports three beams and each beam includes six channels, then each feeder link 240 has 18 channels with which to work. With six gateways 250, there are a total of 108 channels. In order to provide diversity resources for two failed feeder links 240, the remaining four feeder links need to absorb the entire data load. In other words, assuming static channel selection, four feeder links-worth of channels should be active and the rest need to be reserved for diversity. Six feeder links can support 18 channels each, for a total of 72 active channels and 36 reserved channels. If the 72 channels are distributed evenly among the 18 beams, each beam will have four active channels and two diversity channels, as illustrated in FIG. 3.

In this example, each feeder link, including degraded link 295 has three beams of four active channels each, for a total of 12 active channels. When degraded link 295 experiences a service outage, its 12 channels need to be switched to available diversity channels. Each feeder link has three beams of two diversity channels each, for a total of six diversity channels for each feeder link. In which case, the 12 active channels from link 295 will be switched and distributed to at least two other feeder links. Of course, as mentioned above, alternative embodiments may distribute diversity channels unevenly, and/or distribute the diversity channels dynamically, among feeder links.

Figure 4:
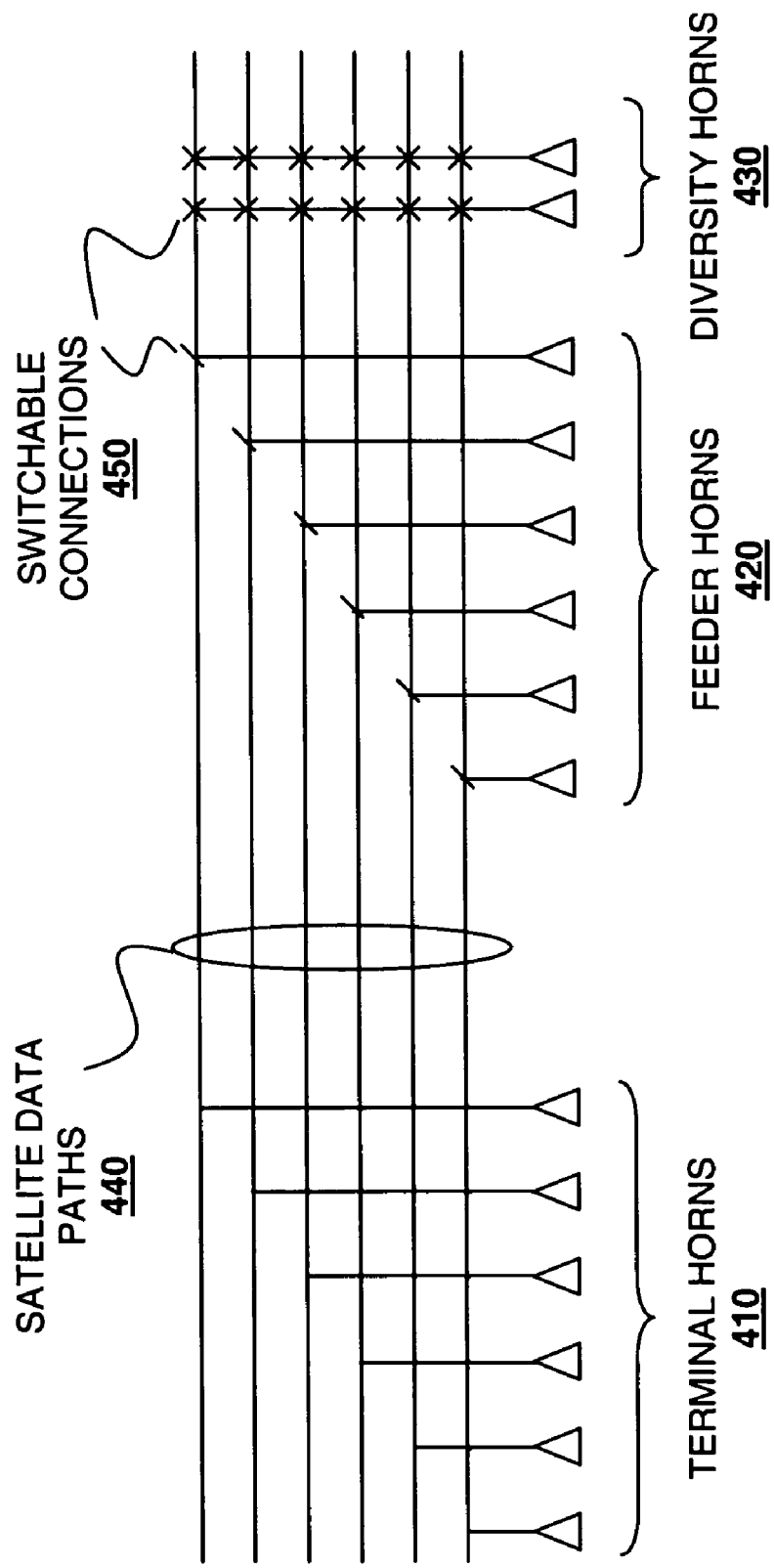
FIG. 4 illustrates one embodiment of a switch matrix suitable for the present invention.

FIG. 4 illustrates one embodiment of a switch matrix that can be used in satellite 120 of FIG. 1 to switch degraded links to diversity gateways. In the embodiment of FIG. 4, satellite 120 includes six terminal horns 410. Terminal horns 410 are antennas that each project three beams 130 for the terminal links in service area 110. Satellite 120 also includes six feeder horns 420, five of which correspond to feeder links 140 and one of which corresponds to degraded link 195. Data paths 440 connect terminal horns 410 and feeder horns 420 through the satellite.

Satellite 120 also includes diversity horns 430 which correspond to diversity links 160. The switch matrix comprises switchable connections 450. When degraded link 195 is detected among one of feeder horns 420, the affected feeder horn is disconnected from its respective data path 440 and one of diversity horns 430 is coupled to the data path in place of the affected feeder horn.

With the exception of switchable connections 450, data paths 440 are intended to represent any type of data paths suitable for use in a satellite. Data paths 440 may include, for instance, analog-to-digital conversions, digital-to-analog conversions, mixing up from or down to a base band signal (although in many embodiments it is not necessary to operate on a baseband version of the signal), various forms of data processing, etc.

Figure 5:
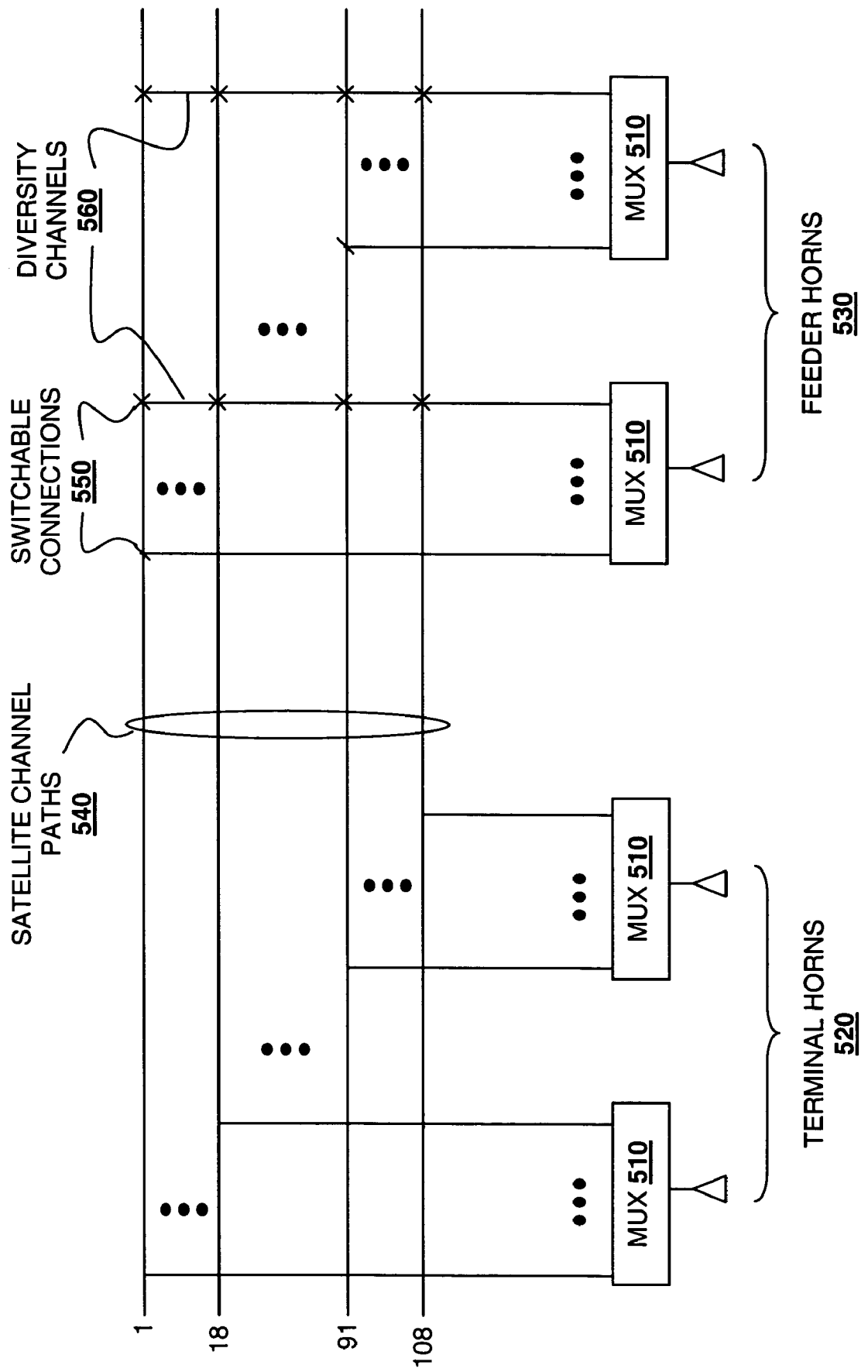
FIG. 5 illustrates another embodiment of a switch matrix suitable for the present invention.

FIG. 5 illustrates one embodiment of a switch matrix that can be used in satellite 220 of FIG. 2 to switch active channels from degraded links to diversity channels. The switch matrix is very similar to the one illustrated in FIG. 4. However, instead of switching at the feeder-link level, the embodiment of FIG. 5 switches at the channel level. Multiplexers/demultiplexers (muxes) 510 are inserted between terminal horns 520 and data paths 540, and between feeder horns 530 and data paths 540. Muxes 510 break the channels from each beam out into their constituent parts for incoming signals, and combine channels into beams for outgoing signals.

In the illustrated embodiment, channels are statically assigned as either active channels or diversity channels. Switchable connections 550 for active channels are connectable to only one channel. Switchable connections for diversity channels, such as diversity channels 560, are connectable to all the channels. In which case, the active channels from degraded link 295 are disconnected from their normal active data paths and the data paths are reconnected to diversity channels 560.

Figure 10:
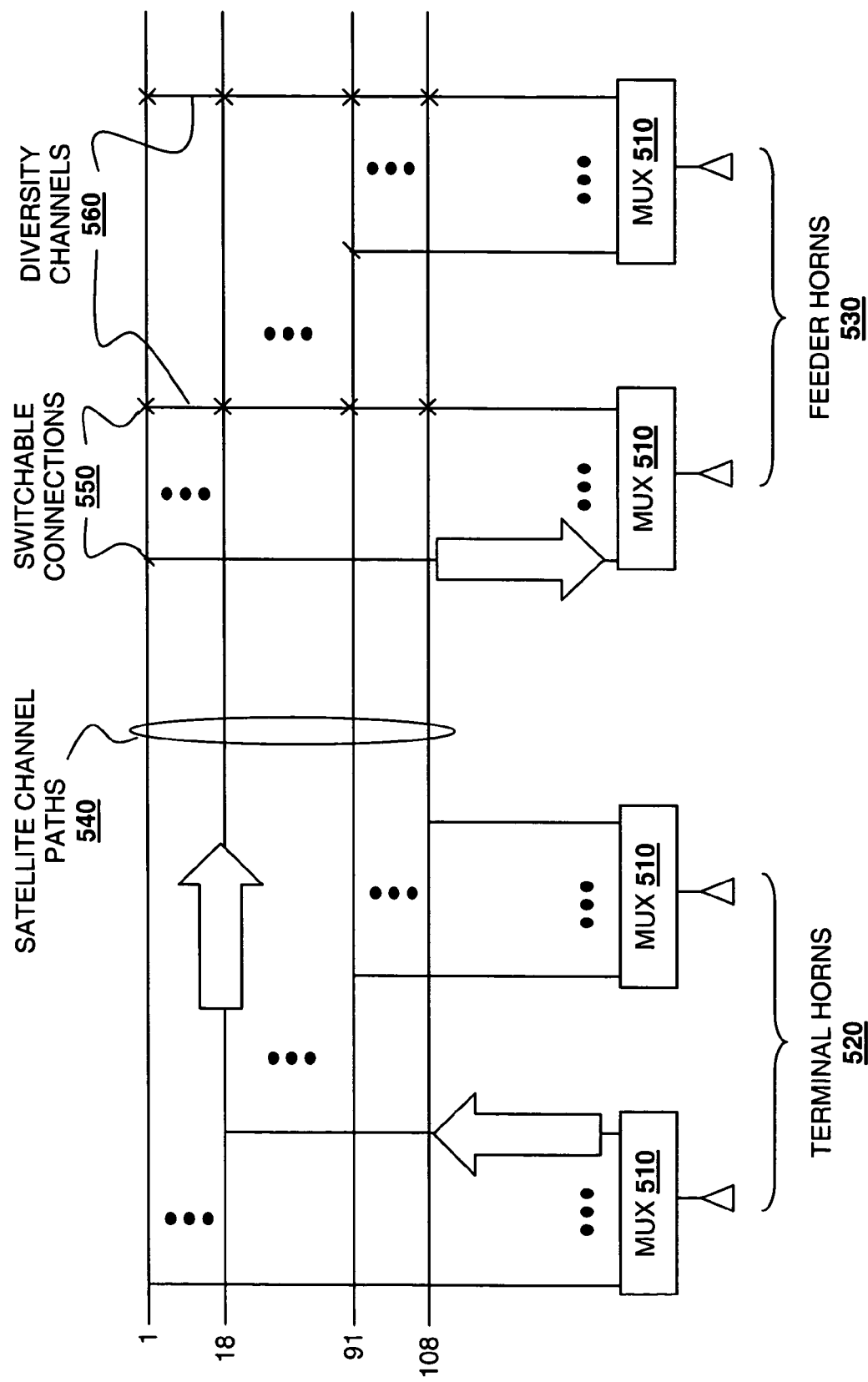
FIG. 10 shows the switch matrix of FIG. 5 with a normal data path selected between a terminal horn and a feeder horn.
Figure 11:
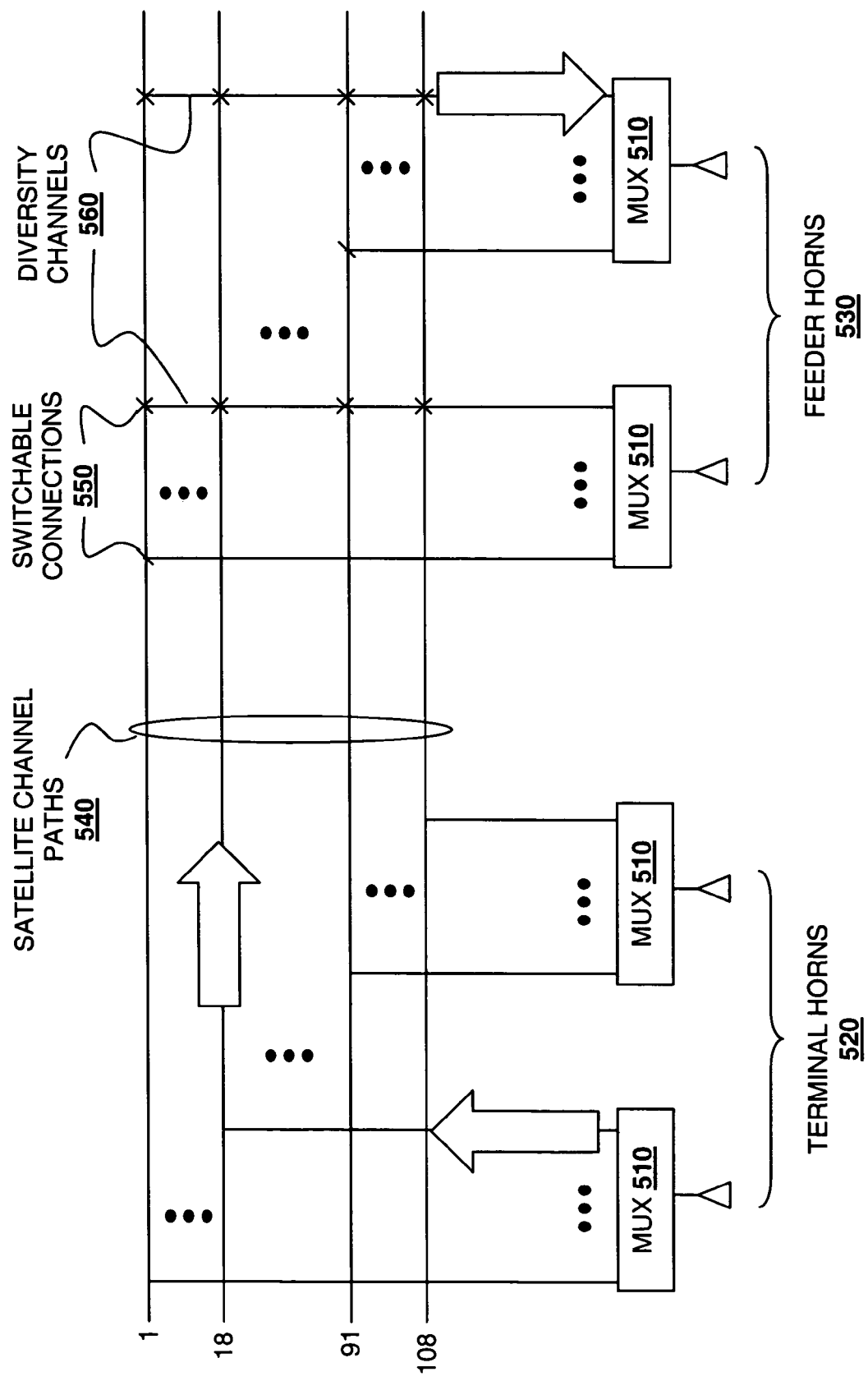
FIG. 11 shows the switch matrix of FIG. 5 with a diversity pathway selected between a terminal horn and a feeder horn.

FIGS. 10 and 11 respectively show the flow of information before and after switching to a diversity channel. More particularly, FIG. 10 shows an illustrative example wherein information received on channel 18 is switched normally to its allocated outbound feeder horn, beam, and channel. FIG. 11 shows an illustrative example in which the information received on channel 18 is routed through a diversity pathway.

In an alternative embodiment, every channel connection for feeder horns 530 is connectable to all of data paths. It will be appreciated by those skilled in the art and having the benefit of the present disclosure that any suitable switching technique known in the art can be used to dynamically connect channels from terminal horns to feeder horns through the switch matrix. In which case, channels can be dynamically assigned as either active or diversity channels. In one embodiment, all the data processing for dynamic switching is performed at a ground station, such as a gateway, and switching commands are delivered to the satellite from the ground.

Figure 6:
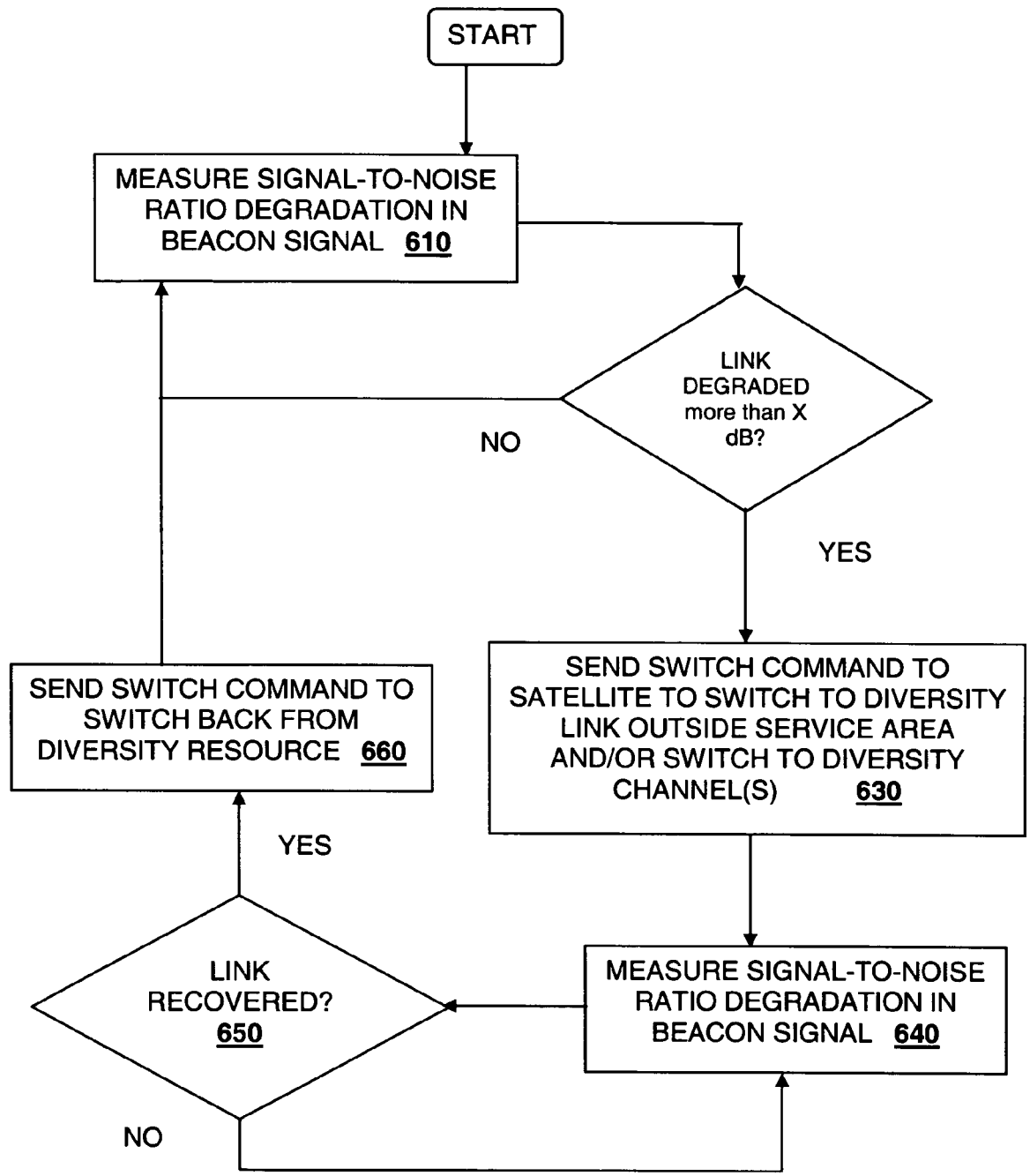
FIG. 6 is a flowchart of one embodiment from the perspective of a gateway.

FIG. 6 demonstrates one embodiment of the present invention from the perspective of a gateway. Once the process starts, at 610, the gateway measures one or more characteristics of a beacon signal received from the satellite. In this illustrative embodiment, a signal-to-noise ratio (SNR) degradation is determined from such measurements, wherein the SNR degradation in the beacon signal represents the degradation level in the feeder link at the gateway. It will be appreciated that in alternative embodiments, rather than determining the degradation in SNR, a determination may simply be made that the instantaneous received signal strength, or other parameter, is below a predetermined threshold value. At 620, as long as the SNR is within an acceptable range, or a range for which the gateway can compensate by varying power or gain, the process simply loops back through 610.

If, however, the SNR degradation as determined at 620 is such as to constitute a service outage, then the gateway sends a command 630 to the satellite to switch to diversity resources. Such diversity resources may be (1) a diversity link to a gateway located outside the service area; (2) diversity channels through one or more feeder links to gateways within the service area; or some combination of the two. It will, be appreciated by those skilled in the art and having the benefit of the present disclosure that the gateways supplying the diversity channels are also informed of the required channel switching.

Still referring to the illustrative embodiment of FIG. 6, at 640 and 650, the gateway continues to monitor the SNR and determine whether the signal quality has recovered. If the signal quality improves to the point that the feeder link has recovered, then the gateway sends a command 660 to the satellite to switch back. Then, in this illustrative embodiment, the process starts over.

In one embodiment, the process repeats fast enough to compensate for any anticipated rate of change in the SNR degradation. That is, the degradation is detected fast enough so that the switch command is sent before communications are totally disrupted. In other embodiments, any suitable techniques known in the art can be used to improve the likelihood that the switch command is received. For instance, the switch command could be sent repeatedly and/or at a very low data rate, possibly allowing the switch command get through during brief valleys or lulls in the interference.

In another embodiment, switch commands are not sent directly from the gateway to the satellite. Instead, a switch command is sent through a network, such as the Internet, from the degraded gateway to one or more of the diversity gateways, or gateways providing diversity channels, and sent from there to the satellite.

Figure 7:
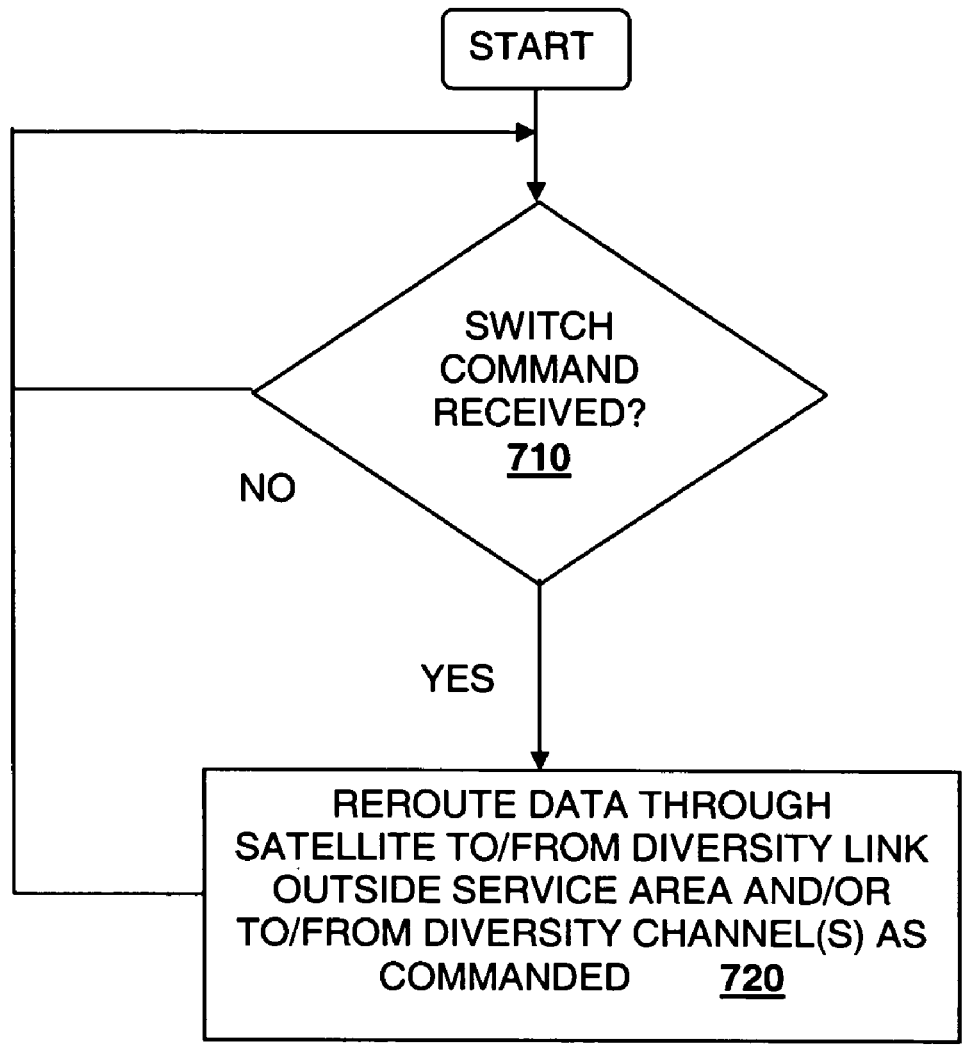
FIG. 7 is a flowchart of one embodiment from the perspective of a satellite.

FIG. 7 demonstrates one embodiment of the present invention from the perspective of a satellite. Once the process begins, the satellite waits for switch commands at 710. Whenever a switch command is received, the satellite reroutes data to, or from, diversity resources as instructed at 720.

In another embodiment, the satellite performs more of the processing. That is, the satellite could measure signal quality, decide on its own when to switch to diversity resources, and send commands to those diversity resources informing them of the switch. However, it is usually less expensive, as well as more reliable, to keep as much processing as possible on the ground. On-board processing also consumes valuable satellite power that may be better spent increasing signal strength.

Figure 8:
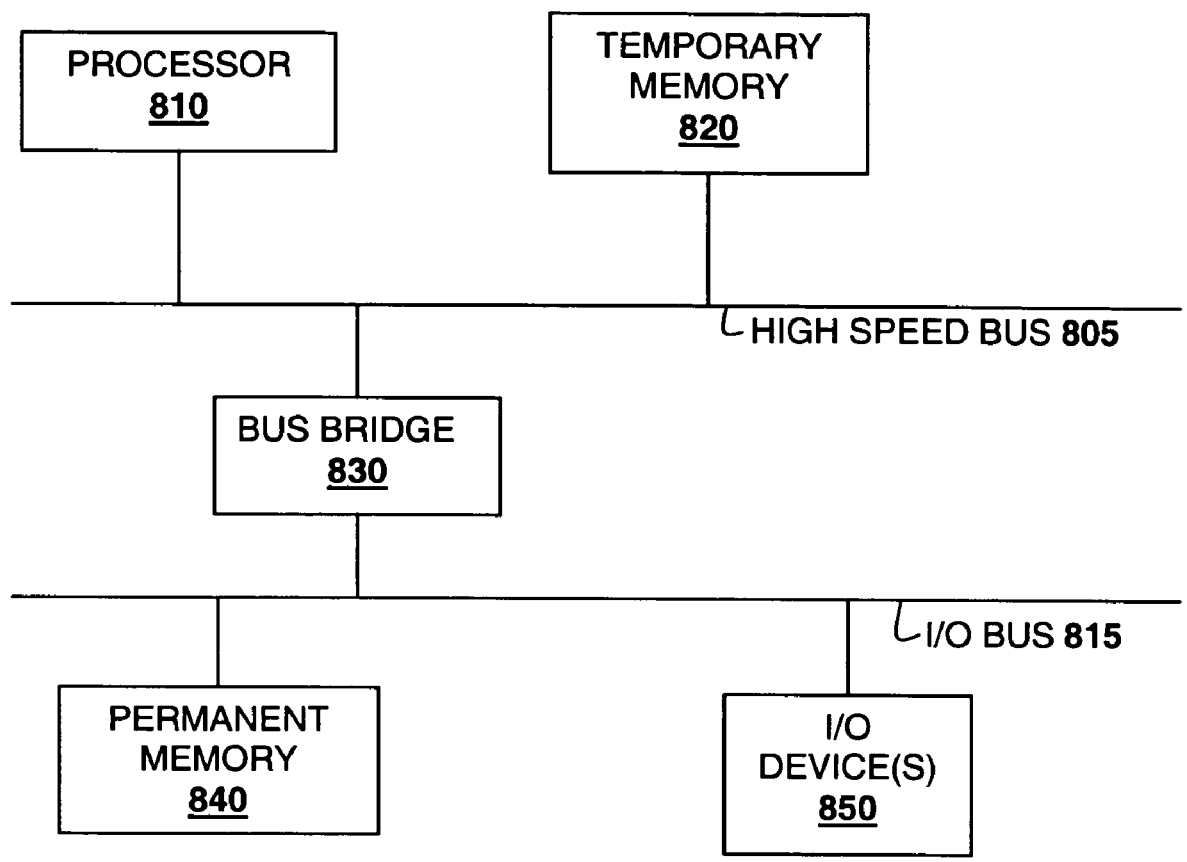
FIG. 8 illustrates one embodiment of a hardware system to implement various embodiments of the present invention.

Various embodiments of the present invention use computational resources to carry out the above-described functionality. FIG. 8 illustrates one embodiment of a hardware system intended to represent a broad category of computer systems such as personal computers, workstations, and/or embedded systems. In the illustrated embodiment, the hardware system includes processor 810 coupled to high speed bus 805, which is coupled to input/output (I/O) bus 815 through bus bridge 830. Temporary memory 820 is coupled to bus 805. Permanent memory 840 is coupled to bus 815. I/O device(s) 850 is also coupled to bus 815. I/O device(s) 850 may include a display device, a keyboard, one or more external network interfaces, etc.

Certain embodiments may include additional components, may not require all of the above components, or may combine one or more components. For instance, temporary memory 820 may be on-chip with processor 810. Alternatively, permanent memory 840 may be eliminated and temporary memory 820 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternative internal networks including, for instance, an internal network based on a high speed system bus with a memory controller hub and an I/O controller hub. Additional components may include additional processors, a CD ROM drive, additional memories, and other peripheral components known in the art.

In one embodiment, as described above, is implemented using one or more hardware systems such as the hardware system of FIG. 8. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 840.

Alternatively, as shown in FIG. 9, the software routines can be machine executable instructions 910 stored using any machine readable storage medium 920, such as a diskette, CD-ROM, magnetic tape, digital video or versatile disk (DVD), laser disk, ROM, flash memory, etc. The series of instructions need not be stored locally, and could be received from a remote storage device, such as a server on a network, a CD ROM device, a floppy disk, etc., through, for instance, I/O device(s) 850 of FIG. 8.

From whatever source, the instructions may be copied from the storage device into temporary memory 820, and then accessed and executed by processor 810. In one implementation, these software routines are written in the C programming language. It is to be appreciated, however, that these routines may be implemented in any of a wide variety of programming languages.

In alternative embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards, and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, reducing service outages in a multibeam satellite system is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the subjoined Claims.

The invention claimed is:

1. A system for reducing service outages in a geosynchronous multibeam satellite system, the system comprising:
    a plurality of feeder links to a single geosynchronous multibeam satellite of the geosynchronous multibeam satellite system, each feeder link comprising a predetermined number of channels, the predetermined number of channels comprising active channels and diversity channels;
    a means for detecting at least one degraded feeder link from the plurality of feeder links; and
    a recoverable network routing protocol apparatus for switching the active channels of the at least one degraded feeder link to the diversity channels of at least one unaffected feeder link from the plurality of feeder links, said unaffected feeder link being located in a remote location from the affected feeder link to serve at least one user as the affected feeder link.

2. The system of claim 1 further comprising:
    a plurality of gateways, each gateway corresponding to each feeder link; and
    the recoverable network routing protocol apparatus comprising a means to switch a first gateway corresponding to the at least one degraded feeder link to at least one second gateway corresponding to the at least one unaffected feeder link.

3. The system of claim 2 where in the recoverable network routing protocol apparatus comprises a network commanded switching apparatus.

4. The system of claim 2 wherein the at least one second gateway comprises at least one second gateway outside of a service region.

5. The system of claim 2 wherein the at least one second gateway comprises at least one second gateway inside of a service region.

6. The system of claim 2 wherein the at least one second gateway comprises a combination of at least one second gateway inside of a service region and at least one gateway outside of the service region.

7. The system of claim 1 wherein the recoverable network routing protocol apparatus comprises a means for redirecting traffic from the active channels of the degraded feeder link to the diversity channels of the feeder link or feeder links that the traffic is redirected to.

8. The system of claim 1 wherein the recoverable network routing protocol apparatus comprises an internet system.

9. The system of claim 1 wherein the recoverable network routing protocol apparatus comprises an intranet system.

10. A method for reducing service outages in a geosynchronous multibeam satellite system, the method comprising the steps of:
    providing a plurality of feeder links to a single geosynchronous multibeam satellite of the geosynchronous multibeam satellite system, each feeder link comprising a predetermined number of channels, the predetermined number of channels comprising active channels and diversity channels;
    detecting at least one degraded feeder link from the plurality of feeder links; and
    switching the active channels of the at least one degraded feeder link to the diversity channels of at least one unaffected feeder link from the plurality of feeder links via a recoverable network routing protocol apparatus, said unaffected feeder link being located in a remote location from the affected feeder link to serve a same at least one user as the affected feeder link.

11. The method of claim 10 further comprising:
    providing a plurality of gateways, each gateway corresponding to each feeder link; and
    switching a first gateway corresponding to the at least one degraded feeder link to at least one second gateway corresponding to the at least one unaffected feeder link via the recoverable network routing protocol apparatus.

12. The method of claim 11 wherein the step of switching via a recoverable network routing protocol apparatus comprises switching via a network commanded switching apparatus.

13. The method of claim 11 further comprising locating the at least one second gateway outside of a service region.

14. The method of claim 11 further comprising locating the at least one second gateway inside of a service region.

15. The method of claim 11 further comprising locating the at least one second gateway inside of a service region and locating at least one second gateway outside of the service region.

16. The method of claim 10 further comprising redirecting traffic from the active channels of the degraded feeder link to the diversity channels of the feeder link or feeder links that the traffic is redirected to, by the recoverable network routing protocol apparatus.

17. The method of claim 10 wherein the recoverable network routing protocol apparatus comprises an internet system.

18. The method of claim 10 wherein the recoverable network routing protocol apparatus comprises an intranet system.

19. A storage media comprising program instructions which are computer-executable to implement a reduction of service. outages in a geosynchronous multibeam satellite system, the storage media comprising:
   program instructions that cause a plurality of feeder links to be associated to a single geosynchronous multibeam satellite of the geosynchronous multibeam satellite system, each feeder link comprising a predetermined number of channels, the predetermined number of channels comprising active channels and diversity channels;
   program instructions that cause at least one degraded feeder link from the plurality of feeder links to be detected; and
   program instructions that cause the active channels of the at least one degraded feeder link to the diversity channels of at least one unaffected feeder link to be switched from the plurality of feeder links via a recoverable network routing protocol, said unaffected feeder link being located in a remote location from the affected feeder link to serve a same at least one user as the affected feeder link.

20. The storage media of claim 19 further comprising:
   program instructions that cause a provision of a plurality of gateways, each gateway corresponding to each feeder link; and
   program instructions that cause a first gateway corresponding to the at least one degraded feeder link to be switched to at least one second gateway corresponding to the at least one unaffected feeder link via the recoverable network routing protocol.

21. The storage media of claim 20 wherein the program instructions to switch via the recoverable network routing protocol comprises program instructions to switch via a network commanded switching apparatus.

22. The storage media of claim 20 wherein the at least one second gateway is located outside of a service region.

23. The storage media of claim 20 wherein the at least one second gateway is located inside of a service region.

24. The storage media of claim 20 further wherein he at least one second gateway comprises a combination of at least one second gateway located inside of a service region and at least one second gateway located outside of the service region.

25. The storage media of claim 19 further comprising program instructions that cause traffic from the active channels of the degraded feeder link to be redirected to the diversity channels of the feeder link or feeder links that the traffic is redirected to, by the recoverable network routing protocol.

26. The storage media of claim 19 wherein the recoverable network routing protocol comprises an internet system.

27. The storage media of claim 19 wherein the recoverable network routing protocol comprises an intranet system.

* * * * *

UNITED STATES PATENT AND TRADEMARK OFFICE
CERTIFICATE OF CORRECTION

PATENT NO.      : 7,599,657 B2                                      Page 1 of 1
APPLICATION NO. : 11/177616
DATED           : October 6, 2009
INVENTOR(S)     : Leonard Norman Schiff It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this

Twenty-eighth Day of September, 2010

David J. Kappos
*Director of the United States Patent and Trademark Office*